Dec. 29, 1953 J. H. KINDELBERGER 2,664,140
CHILD'S AUTOMOBILE SEAT
Filed Aug. 25, 1952 2 Sheets-Sheet 1
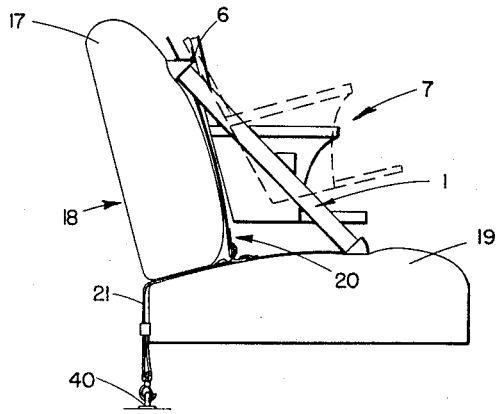
FIG. 1
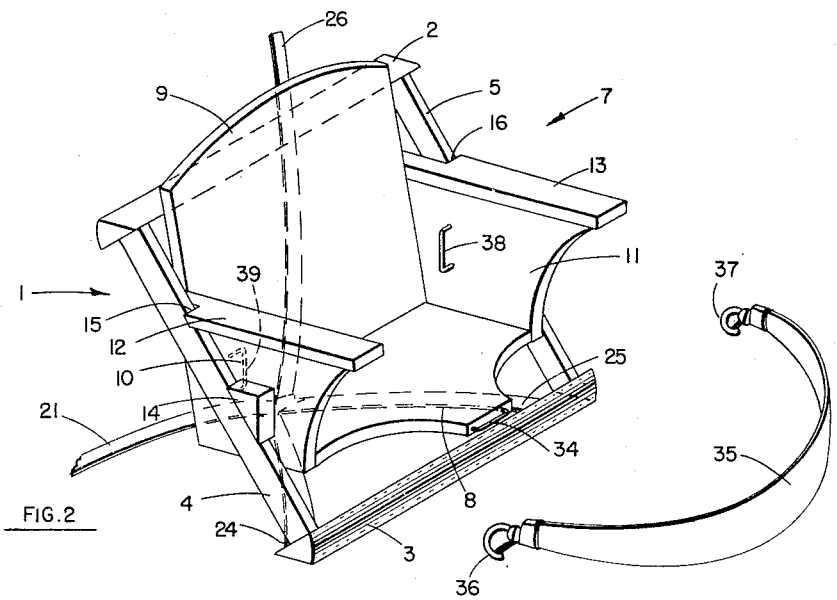
FIG. 2
FIG. 6
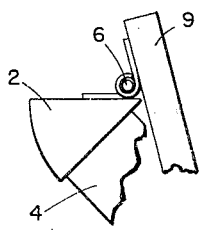
FIG. 4
*INVENTOR.*
JAMES H. KINDELBERGER
*BY*
ATTORNEY Dec. 29, 1953 J. H. KINDELBERGER 2,664,140
CHILD'S AUTOMOBILE SEAT
Filed Aug. 25, 1952 2 Sheets-Sheet 2
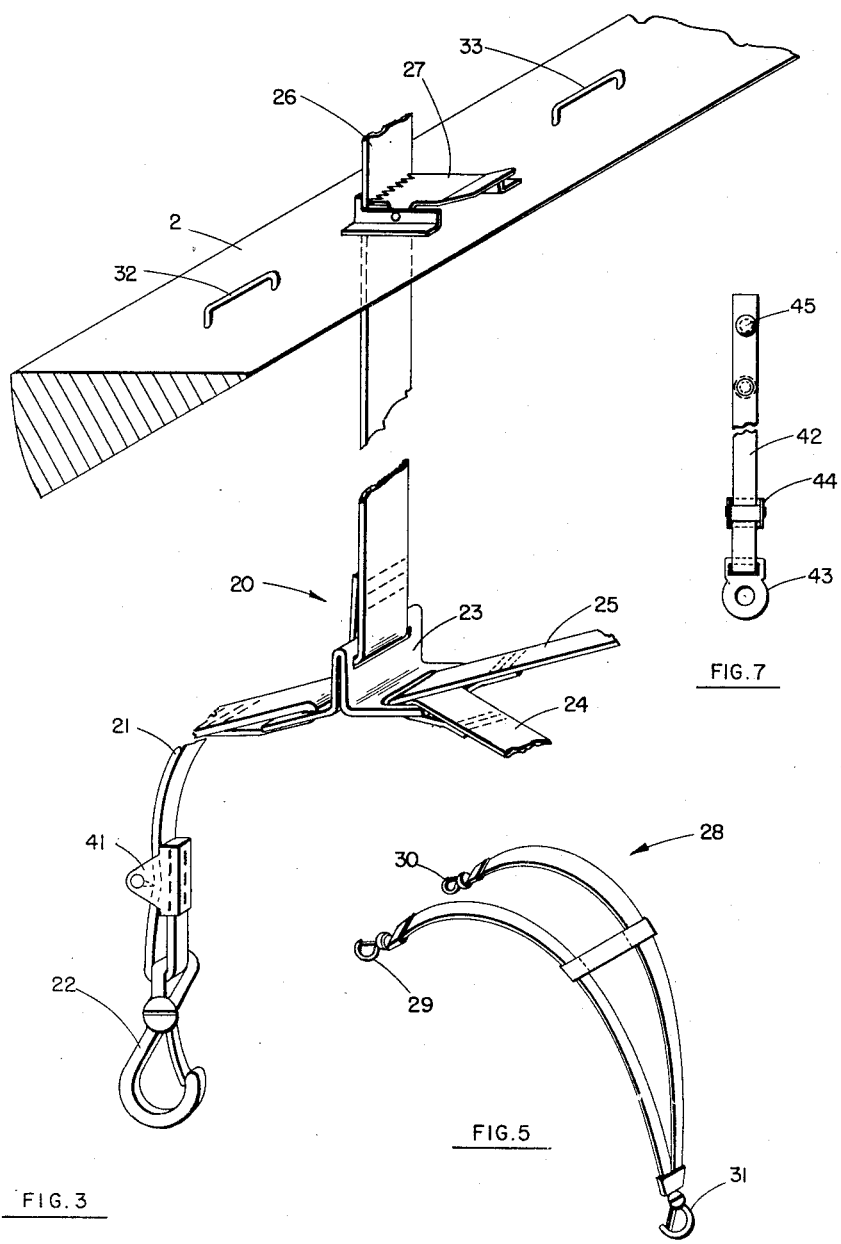
INVENTOR.
JAMES H. KINDELBERGER
BY William P. Lane
ATTORNEY

Patented Dec. 29, 1953

2,664,140

UNITED STATES PATENT OFFICE 2,664,140

CHILD'S AUTOMOBILE SEAT

James H. Kindelberger, Pacific Palisades, Calif.

Application August 25, 1952, Serial No. 306,168

6 Claims. (Cl. 155—11)

This invention pertains to an auxiliary seat for a child.

The seat is adapted for use in automobiles, and is particularly designed to prevent injury to the occupant thereof in the event of an accident or on account of sudden starts or stops.

It is an object of this invention to provide a child's seat which prevents the occupant from being thrown forwardly upon sudden stoppage of the automobile.

It is a further object of this invention to provide a seat which, in the event of a sudden stop, absorbs energy by swinging forwardly and upwardly.

It is still a further object of this invention to provide a child's seat which cushions and distributes impact loads in such a manner as to prevent discomfort or injury to the occupant.

It is still another object of this invention to provide a child's seat which is economical to build and which can be readily attached to or detached from the seat of a standard automobile, and particularly a hinged type seat, to prevent it from crushing the occupant or catapulting him against the interior of the automobile.

Other objects of invention will become apparent from the following description, taken in connection with the accompanying drawings, in which Fig. 1 is a side elevational view of the invention fitted to an automobile seat;

Fig. 2 is a perspective view of the invention;

Fig. 3 is a detail of the strap for holding the seat in place;

Fig. 4 is a detail of the hinge connecting the seat to the frame;

Fig. 5 is a detail view of a harness usable with the invention;

Fig. 6 is a detail of a safety belt; and

Fig. 7 is a detail of an alternative fastening arrangement.

Referring to the drawings, the invention comprises a frame referred to generally as 1 formed of a top rail 2, a bottom rail 3, and struts or side rails 4 and 5. Hingedly connected to the top rail at 6 is a chair referred to generally as 7, and comprising a seat portion 8, a back portion 9, sides 10 and 11, and arm rests 12 and 13. Attached to the sides 10 and 11 are lug portions 14, only one of which is shown, adapted to rest on rails 4 and 5 to limit the downward movement of the chair with respect to the frame. Arms 12 and 13 are cut out at 15 and 16 respectively, to also rest against the rail members to prevent downward movement of the chair.

Top rail 2 is adapted to fit against the back portion 17 of an automobile seat referred to generally as 18, while the bottom rail 3 is adapted to rest upon the bottom portion 19 of the seat. The seat is held in place by means of a strap arrangement referred to generally as 20 and consisting of a strap portion 21 adapted to be secured to the automobile seat or to any suitable supporting structure 40 of the automobile seat or automobile by a suitable fastening means, such as a snap 22 or the like. Strap portion 21 is provided with an adjustable harness portion 41 and connected to a buckle 23 to which are attached a pair of diverging strap portions 24 and 25 suitably connected to bottom rail 3. Also connected to buckle 23 is a strap portion 26 adapted to be connected to top rail 2 by means of a buckle 27.

A harness referred to generally as 28 is provided with snaps 29, 30, and 31 for fastening the child in the seat. The snaps are adapted to attach to eyelets 32 and 33 on top rail 2, and 34 on the seat portion of the chair. A safety belt 35 may also be utilized if desired to fasten the child in the chair. This belt is attached to the chair by snaps 36 and 37 connected to eyelets 38 and 39.

In the operation of the device the frame is placed in an automobile seat with the top rail 2 against the back of the seat and the bottom rail 3 on the bottom of the seat. Strap 21 is suitably fastened to the automobile seat or automobile frame at 40 by means of snap 22 or the like. Strap 26 is then tightened in buckle 27 to depress rail members 2 and 3 into the spring cushions of the automobile seat 18.

In the event of a sudden stop the occupant of the chair will move forwardly and upwardly, and thereby avoid being thrown against the interior of the automobile. This motion also dissipates energy which ordinarily is otherwise absorbed by the occupant. Impact forces resulting from sudden stops are cushioned and distributed not only by the movement of the occupant, but also by the cushioning effect of the rail against the bottom portion 19 of the automobile seat.

In the alternative fastening arrangement shown in Fig. 7, a strap 42 is adapted to be attached in a semi-permanent manner to the car by loop 43 and buckle 44. Strap 42 may then be quickly attached to buckle 23 by snap 45.

The invention is particularly adapted for use with automobile seats having tiltable backs; however, it may also be used with seats of the fixed back type.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A child's seat comprising a frame; a chair hingedly connected to said frame at the upper end thereof; stop means on said chair for limiting downward movement thereof with respect to said frame, said frame being adapted to rest against the back and bottom portions of an automobile seat; and means for connecting said frame to said automobile whereby upon sudden stops of an automobile the chair will swing forwardly and upwardly.

2. A child's seat comprising a frame composed of top, bottom, and side rails; a chair portion hingedly connected to said top rail; lugs on said chair portion adapted to rest on said side rails, said top and bottom rails adapted to rest on the back and bottom, respectively, of an automobile seat; and strap means for holding said top and bottom rails on said automobile seat whereby upon sudden stops of an automobile the chair will swing forwardly and upwardly.

3. A child's seat comprising a frame composed of top, bottom, and side rails; a chair portion hingedly connected to said frame to swing upwardly; arms on said chair portion adapted to rest on said side rails to limit downward movement thereof, said top and bottom rails adapted to rest on the back and bottom, respectively, of an automobile seat; and strap means holding said frame on said automobile seat.

4. A child's seat comprising a rectangular frame composed of a base; a top and side rails connecting said base and top; a chair portion hingedly connected to said frame and having lug portions resting on top of said rails, said base and top adapted to rest against the bottom and back, respectively, of an automobile seat; and strap means holding said frame on said automobile seat whereby upon sudden stops of an automobile the chair will swing forwardly and upwardly.

5. A child's seat comprising a frame having a base, a top, and sides; a chair hingedly connected at its upper end to the upper portion of said frame and having projections resting on said sides, said base being adapted to rest against the bottom and back, respectively, of an automobile seat, and strap means holding said frame firmly in place on said automobile seat.

6. A device as recited in claim 5 in which said chair is provided with a seat portion, and further including harness means connected to said top rail and to said seat portion.

JAMES H. KINDELBERGER.

References Cited in the file of this patent

UNITED STATES PATENTS

| Number | Name | Date |
| --- | --- | --- |
| 264,157 | Hepburn | Sept. 12, 1882 |
| 1,366,798 | Harris | Jan. 25, 1921 |
| 1,397,281 | Haas | Nov. 15, 1921 |
| 2,308,315 | Smith | Jan. 12, 1943 |
| 2,635,676 | Graffius et al. | Apr. 21, 1953 |